United States Patent
Takiguchi

[11] Patent Number: 5,916,059
[45] Date of Patent: Jun. 29, 1999

[54] UP-SHIFT CONTROL APPARATUS OF AUTOMATIC TRANSMISSION

[75] Inventor: Masahiro Takiguchi, Shizuoka, Japan

[73] Assignee: Jatco Corporation, Fuji, Japan

[21] Appl. No.: 08/901,959

[22] Filed: Jul. 29, 1997

[30] Foreign Application Priority Data

Jul. 31, 1996 [JP] Japan .................................. 8-202508

[51] Int. Cl.$^6$ .............................................. F16H 61/08
[52] U.S. Cl. ......................................................... 477/152
[58] Field of Search ............................. 477/152; 475/129

[56] References Cited

U.S. PATENT DOCUMENTS

| | | | |
|---|---|---|---|
| 4,942,787 | 7/1990 | Aoki et al. | 477/152 |
| 5,005,441 | 4/1991 | Narita | 477/152 |
| 5,109,733 | 5/1992 | Ishikawa et al. | 477/152 |
| 5,138,906 | 8/1992 | Iwatsuki et al. | 477/152 |
| 5,182,970 | 2/1993 | Goto et al. | 477/152 |
| 5,399,131 | 3/1995 | Kamada et al. | 477/152 |
| 5,431,608 | 7/1995 | Hirose | 477/152 |

FOREIGN PATENT DOCUMENTS 2-229959  9/1990  Japan .

*Primary Examiner*—Dirk Wright
*Attorney, Agent, or Firm*—Foley & Lardner

[57] ABSTRACT

An up-shift control apparatus installed to an automatic transmission, where an up-shift is executed by disengaging a first friction element and by engaging a second friction element, includes an A/T control unit for deciding the up-shift, a gear ratio detecting unit for detecting a gear ratio of the automatic transmission, a discharging pressure control actuator, and an up-shift discharging pressure control unit. The up-shift discharging pressure control unit outputs a command to the discharging pressure control actuator to temporally increase the discharging pressure of the first friction element when the detected gear ratio becomes a preset gear ratio indicative of a time just before the end of the inertia phase during an up-shift.

6 Claims, 7 Drawing Sheets

|  | REV/C | HIGH/C | 2-4/B | LOW/C | L&R/B | LOW O.W.C |
|---|---|---|---|---|---|---|
| 1st |  |  |  | ○ | ◌ | ⊘ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| GEAR POSITION \ SOLENOID | SHIFT SOLENOID (A) | SHIFT SOLENOID (B) |
|---|---|---|
| 1st SPEED | ○ | ○ |
| 2nd SPEED | × | ○ |
| 3rd SPEED | × | × |
| 4th SPEED | ○ | × |

{ ○ ON (DRAIN CIRCUIT CLOSED CONDITION)
{ × OFF (DRAIN CIRCUIT OPEN CONDITION)

UP-SHIFT CONTROL APPARATUS OF AUTOMATIC TRANSMISSION

BACKGROUND OF THE INVENTION

The present invention relates to improvements in an up-shift control apparatus of an automatic transmission, and more particularly to a control of an accumulator back pressure of a friction element to be disengaged in an up-shift transient time.

Conventionally, an up-shift operation of an automatic transmission is executed such that when a charging pressure of an engaged friction element reaches a predetermined pressure value, an accumulator back pressure of a disengaged clutch is drained through a timing control by means of a switching control of a sequence valve so as to decrease the hydraulic capacity of the clutch discharging pressure. Thereafter, the shift change is finished. In this up-shift, if a throttle opening degree of an engine is small during the shift change, a shock due to the shift change is sufficiently suppressed. However, if the throttle opening degree becomes within a range from medium to high during the shift change, the change of the engine rotation speed due to the shift change becomes large and the change of the rotation due to the inertia is applied to the output shaft. Therefore, the output shaft torque is largely decrease at an ending period of the shift change, and large chock is generated.

In order to decrease such shock at the ending period during the up-shift, Japanese Provisional Publication No. 2-229959 discloses a method for decreasing the change of the engine rotation speed. More particularly, when an actual speed ratio becomes a speed ratio indicative of a period just before the end of an inertia phase, a charging pressure of a friction element to be engaged is temporally decreased so as to delay the proceeding of the shift change for the purpose of the decreasing of the change of the engine rotation speed.

However, this conventional up-shift control apparatus has problems such that a period for the shift change is elongated by sufficiently ensuring the suppression of the shift change shock or that the shift change shock is generated by an insufficient time elongation. That is, in case that the up-shift is execute through only the charging pressure decreasing control, the magnitude of the decreased charging pressure is set so as to suppress the elongation of the period for the shift change. Therefore, it is difficult to preferably suppress the engagement shock by this conventional control method.

SUMMARY OF THE INVENTION

It is an object of the present invention to provide an improved up-shift control apparatus of an automatic transmission which apparatus preferably suppresses a shock during the up-shift without elongating a time period for the up-shift.

In brief, the above object is achieved by an up-shift control apparatus shown in FIG. 1, which is installed to an automatic transmission arranged to execute an up-shift by disengaging a first friction element a and by engaging a second friction element b. The up-shift control apparatus comprises an up-shift deciding means c for deciding whether the up-shift is executed, a gear ratio detecting means d for detecting a gear ratio, a discharging pressure control actuator e, and an up-shift discharging pressure control means f. When during the up-shift the detected gear ratio becomes a preset gear ratio indicative of a period just before the end of inertia phase, the up-shift discharging pressure control means f outputs a command signal to the discharging pressure control actuator e so as to temporally increase the discharging pressure of the first friction element a.

An aspect of the present invention resides in an up-shift control apparatus of an automatic transmission. The automatic transmission includes first and second friction elements and executing an up-shift by disengaging the first friction element and engaging the second friction element. The up-shift control apparatus comprises an up-shift decision means, a gear ratio detecting means, a discharging pressure control actuator, and an up-shift discharging pressure control means. The up-shift decision means decides as to whether the up-shift operation is executed. The gear ratio detecting means detects a gear ratio of the automatic transmission. The discharging pressure control actuator controls a discharging pressure of the first friction element. The up-shift discharging pressure control means outputs a first command signal to the discharging pressure control actuator so as to temporally increase the discharging pressure of the first friction element when the detected gear ratio becomes a preset gear ratio indicative of a time just before the end of the inertia phase during the up-shift.

DETAILED DESCRIPTION OF THE INVENTION

Referring to FIGS. 2 to 8, there is shown an embodiment of an up-shift control apparatus of an automatic transmission according to the present invention.

Figures 2, 3:
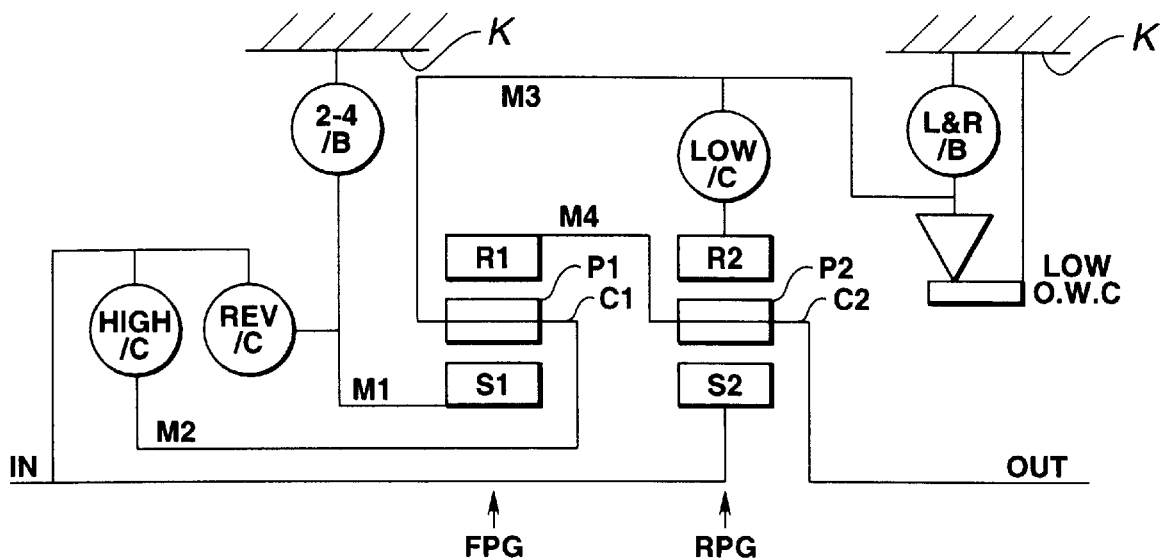
FIG. 2 is a schematic view of a power transmission mechanism of the automatic transmission applied to the up-shift control apparatus of FIG. 1.
FIG. 3 is a table which shows engagement logic of friction elements of the automatic transmission of FIG. 2 with the selected shift range of the automatic transmission.

FIG. 2 shows the automatic transmission to which the up-shift control apparatus is applied. The automatic transmission comprises an input shaft IN, an output shaft OUT, a front planetary gear unit FPG, and a rear planetary gear unit RPG. The front planetary gear unit FPG includes a first sun gear S1, a first ring gear R1, a first pinion P1 and a first pinion carrier C1. The rear planetary gear unit RPG includes a second sun gear S2, a second ring gear R2, a second pinion P2 and a second pinion carrier C2. Further, the automatic transmission includes a reverse clutch REV/C (hereinafter, call as R/C), a high clutch HIGH/C (hereinafter, call as H/C), a 2–4 brake 2–4/B, a lower clutch LOW/C (hereinafter, call as L/C), a low and reverse brake L&R/B, and a low one way clutch LOW O.W.C.

The first sun gear S1 is interconnected with the input shaft IN through a first rotation member M1 and the reverse clutch R/C, and is interconnected with a case K through the first rotation member M1 and the 2–4 brake 2–4/B. The first pinion carrier C1 is interconnected with the input shaft IN through a second rotation member M2 and the high clutch H/C, and is interconnected with the case K through a third rotation member M3 and the low & reverse brake L&R/B. The first pinion carrier C1 is interconnected with the second ring gear R2 through the third rotation member M3 and the low clutch L/C. The low & reverse brake L&R/B and the low one way clutch LOW O.W.C are arranged in tandem. The first ring gear R1 is directly connected with the second pinion carrier C2 through a fourth rotation member M4, and the output shaft OUT is directly connected with the second pinion carrier 2C. The second sun gear S2 is directly connected with the input shaft IN. This automatic transmission is arranged to eliminate a one way clutch for obtaining a smooth shift change during 4–3 up-shift and a clutch which was necessarily used to ensure engine brake according to the installation of the one way clutch. Therefore, the number of friction elements of this automatic transmission is decreased and the size thereof is decreased.

FIG. 3 shows an engagement logic for obtaining four forward speeds and one reverse speed by this automatic transmission.

First speed ($1^{st}$ speed) is obtained by the hydraulic engagement of the low clutch L/C, and one of the hydraulic engagement of the low & reverse clutch L&R/C and the mechanical engagement of the low one way clutch LOW O.W.C. Therefore, in the first speed of the automatic transmission, the second sun gear 2S functions as an input, the second ring gear 2R is fixed, and the second carrier 2C functions as an output.

Second speed ($2^{nd}$ speed) is obtained by the hydraulic engagement of the low clutch L/C and the 24 brake 2–4/B. Therefore, the second sun gear 2S functions as an input, the first ring gear 1R is fixed, and the second carrier 2C functions as an output.

Third speed ($3^{rd}$ speed) is obtained by the hydraulic engagement of the high clutch H/C and the low clutch L/C. The second ring gear 2R and the second sun gear 2S simultaneously function as input, the second carrier 2C functions as output. The third speed establishes gear ratio=1.

Fourth speed ($4^{th}$ speed) is obtained by the hydraulic engagement of the high clutch H/C and the 2–4 brake 2–4/B. That is, the first pinion carrier 1C and the second sun gear 2S function as input, the first sun gear 1S is fixed, and the second pinion carrier 2C functions as output. Therefore, an overdrive shift position is established.

Reverse speed (Rev. speed) is obtained by the hydraulic engagement of the reverse clutch REV/C and the low and reverse brake L&R/B. That is, the first and second sun gears 1S and 2S function as input, the first pinion carrier 1C is fixed, and the second carrier 2c functions as output.

The 2–4 brake 2–4/B is a multi-plate brake type whose structure is as same as that of a multi-plate clutch.

Figure 4:
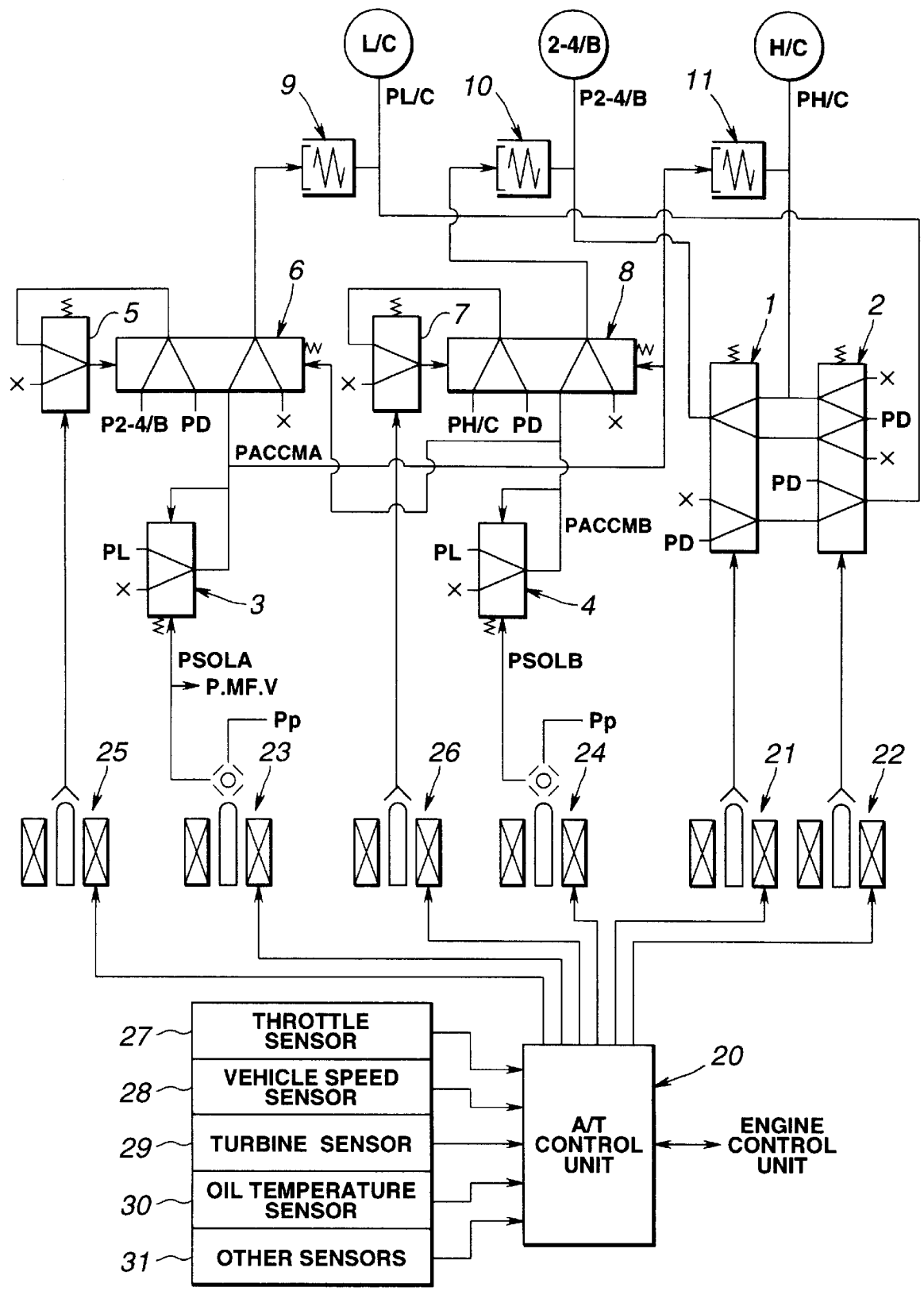
FIG. 4 is a system view of a hydraulic pressure control section and an electronic control section of the automatic transmission to which the up-shift control apparatus of a first embodiment is applied.

FIG. 4 shows a control system for establishing the above-mentioned D-range $1^{st}$ to $4^{th}$ speeds wherein friction elements, a control valve section and an electronic control section are included. Such friction elements are the low clutch L/C, the 2–4 brake 2–4/B and the high clutch H/C. The control valve section includes a first shift valve 1, a second shift valve 2, a first accumulate control valve 3, a second accumulate control valve 4, a low clutch timing valve 5, a low clutch timing valve 5, a low clutch sequence valve 6, a 2–4 brake timing valve 7, 2–4 brake sequence valve 8, a low clutch accumulator 9, a 2–4 brake accumulator 10 and a high clutch accumulator 11.

The first shift valve 1 and the second shift valve 2 execute switching operations for changing shift position among $1^{st}$ speed to $4^{th}$ speed (OD) lo according to the operation of a first shift solenoid 21 and a second shift solenoid 22. The first accumulate control valve 3 controls a first accumulate control pressure $P_{ACCMA}$ by decreasing a line pressure $P_L$ according to a magnitude of a first solenoid pressure $P_{SOLA}$ created by a line pressure duty solenoid 23. The first solenoid pressure $P_{SOLA}$ created by the line pressure duty solenoid 23 is supplied a pressure modifier valve which controls a modifier pressure functioning as a signal pressure of the line pressure $P_L$ created by a pressure regulator valve (not shown). The second accumulate control valve 4 controls the second accumulate control pressure $P_{ACCMB}$ by decreasing the line pressure $P_L$ according to the magnitude of the second solenoid pressure $P_{SOLB}$ generated by a 2–4/B duty solenoid 24.

The low clutch timing valve 5 is of a selector valve and functions to set the signal pressure passage at a drain side when the low clutch timing solenoid 25 is turned OFF. The low clutch timing valve 5 further functions to set the signal pressure passage at a communication side when the low clutch timing solenoid 25 is turned ON. The low clutch sequence valve 6 executes a back pressure control of the low clutch accumulator 9 when an up-shift to $4^{th}$ speed is executed or when the down-shift from $4^{th}$ speed is executed.

The 2–4 brake timing valve 7 is of a selector valve and functions to set the signal pressure passage at a drain side when the 2–4 brake timing valve 7 is turned OFF. The low clutch timing valve 5 further functions to set the signal pressure passage at a communication side when the 2–4 brake timing valve 7 is turned ON. The 2–4 brake sequence valve 8 executes a back pressure control of the low clutch accumulator 9 when an up-shift to $3^{rd}$ speed is executed or when the down-shift from $3^{rd}$ speed is executed.

The first accumulator control pressure $P_{ACCMA}$ is led to a back pressure chamber of the low clutch accumulator 9 through the low clutch sequence valve 6 so as to smoothen the engagement and disengagement of the low clutch L/C. The second accumulator control pressure $P_{ACCMB}$ is led to a back pressure chamber of the 2–4 brake accumulator 10 through the 2–4 brake sequence valve 8 so as to smoothen the engagement and disengagement of the 2–4 brake 2–4/B. The first accumulate control pressure $P_{ACCMA}$ is directly led to a back pressure chamber of the high clutch accumulator 10 to smoothen the engagement and disengagement of the high clutch H/C.

The electronic control section of FIG. 4 includes a first shift solenoid 21, a second shift solenoid 22, a line pressure duty solenoid 23, a 2–4/B duty solenoid 24, a low clutch timing solenoid 25 and a 2–4/B timing solenoid 26 as an actuator for controlling a hydraulic pressure according to a drive command from an A/T (automatic transmission) control unit 20. The A/T control unit 20 is connected with a throttle sensor 27 for detecting a throttle opening degree, a vehicle speed sensor 28 for detecting a vehicle speed, a turbine sensor 29 for detecting a turbine rotation speed of the automatic transmission, an oil temperature sensor 30 for detecting a temperature of the oil of the automatic transmission, and other sensors 31. These sensors 27 to 31 supply various information to the A/T control unit 20.

Figures 5, 6:
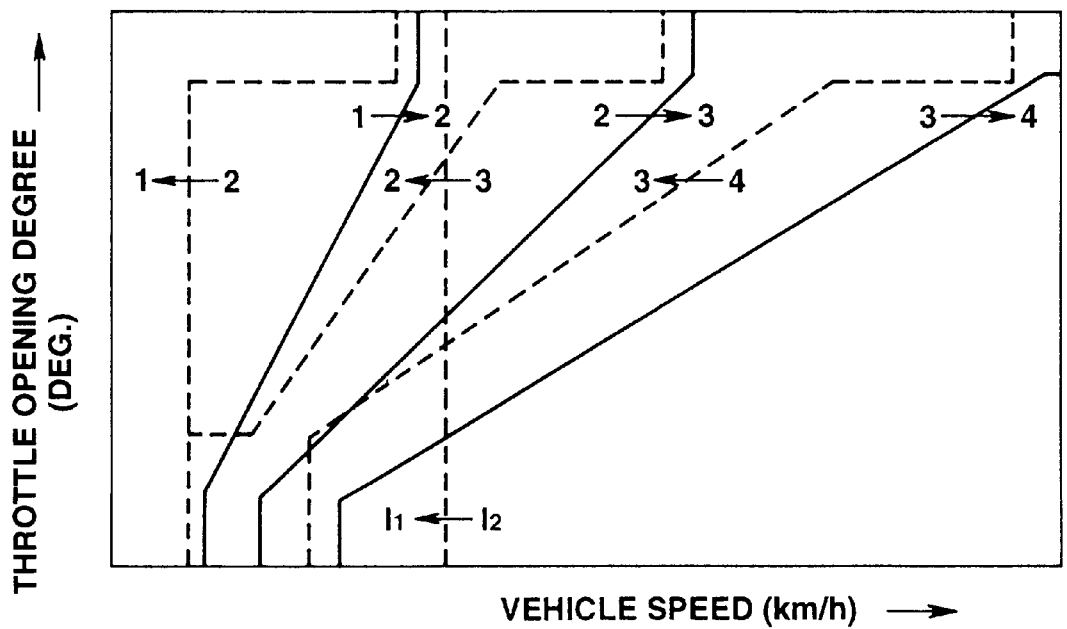
FIG. 5 is a table which shows an operating condition of shift solenoid valves of the hydraulic pressure control apparatus of the first embodiment.
FIG. 6 is a graph which shows shift change characteristics of the hydraulic pressure control apparatus of the first embodiment.

The shift change control for automatically shifting among $1^{st}$ speed to $1^{th}$ speed under the D-range shift position is executed on the basis of the throttle opening degree and the vehicle speed in accordance with a shift change characteristic model of FIG. 6. That is, when the condition of the throttle opening degree and the vehicle speed on FIG. 6 crosses the shift change line of up-shift and down-shift, the shift change command is outputted from the A/T control unit 20. More particularly, according to the shift change command, next shift position of the automatic transmission is determined. In order to set the automatic transmission to the determined shift position, The A/T control unit 20 outputs a control signal to the first shift solenoid 21 and the second shift solenoid 22 according to the shift solenoid operation table of FIG. 5 so as to turn ON or OFF them.

Next, the manner of operation of the automatic transmission will be discussed hereinafter. [Electronic control operation for 2–3 up-shift]

Figure 1:
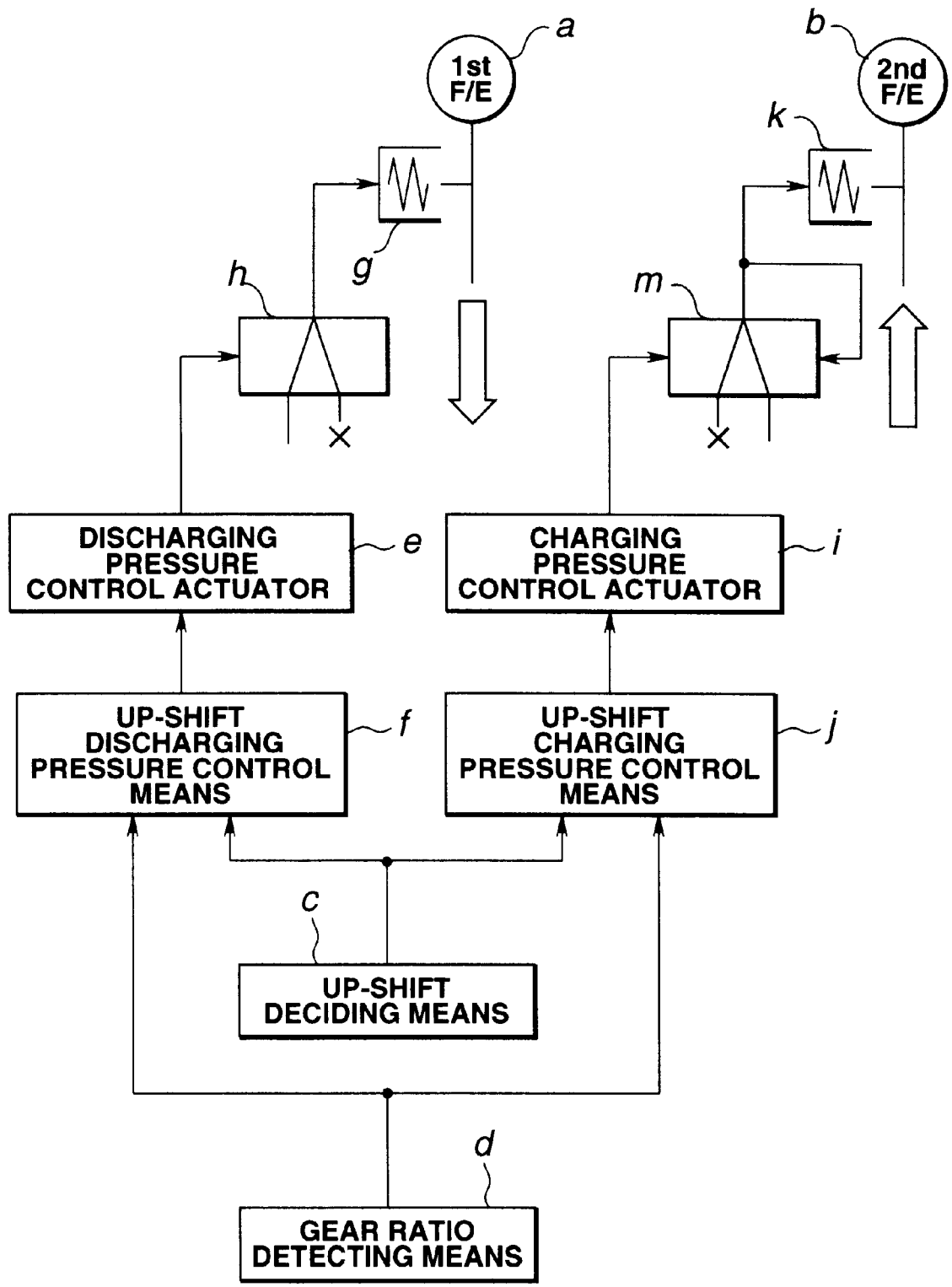
FIG. 1 is a schematic structural view which shows a structure of an up-shift control apparatus of an automatic transmission according to the present invention.
Figure 7:
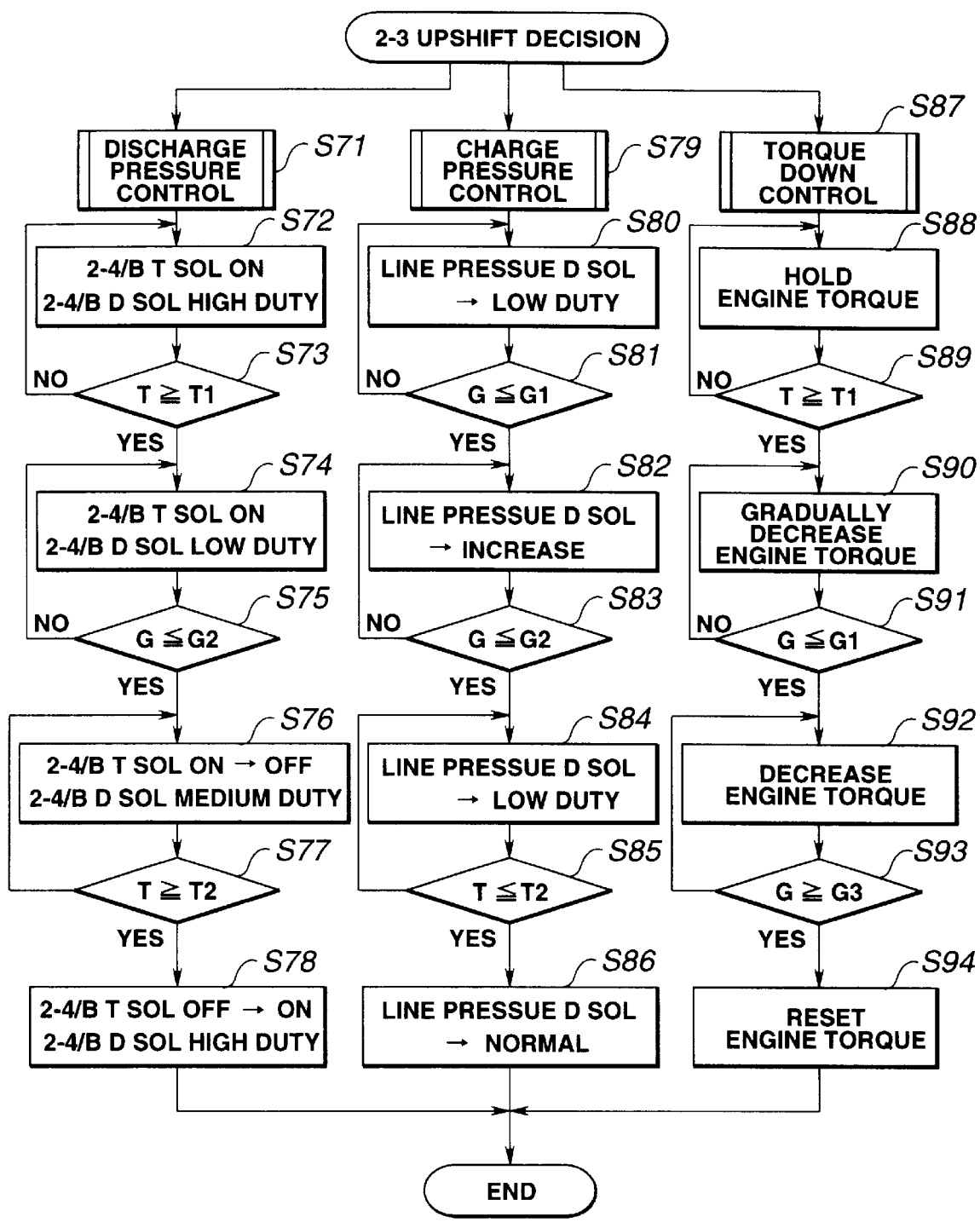
FIG. 7 is a flowchart which shows a procedure of the 2–3 up-shift control executed by an A/T control unit of the first embodiment.

Referring to FIG. 7, the up-shift control operation procedure executed by the A/T control unit 20 during the 2–3 up-shift is shown in the form of a flowchart. The 2–3 up-shift is executed by disengaging the 2–4 brake 2–4/B (corresponding to the first friction element a of FIG. 1) and by engaging the high clutch H/C (corresponding to the second friction element b of FIG. 1).

First, the A/T control unit 20 decides as to whether the automatic transmission is executing the 2–3 up-shift or not. This decision is executed by detecting the 2–3 up-shift command signal generated when a point on the shift change point model M is characteristic of FIG. 6 crosses the 2–3 up-shift line. This decision process corresponds to the up-shift decision means c of FIG. 1.

When the A/T control unit 20 decides that the 2–3 up-shift is now executed, a timer value T for counting an elapsed time from this decision is incremented, and the necessary information such as the throttle opening degree TH is read.

When the A/T control unit 20 decides that the 2–3 up-shift is now executed, the A/T control unit 20 reads the vehicle speed (transmission output shaft rotation speed) from the vehicle speed sensor 28 and the turbine rotation speed (transmission input shaft rotation speed) from the turbine sensor 29, and calculates an actual gear ratio G. Further, the A/T control unit 20 executes a shift change control for switching the command to the second shift solenoid 22 from ON to OFF while the command to the first shift solenoid 21 is kept OFF. In addition, when the A/T control unit 20 decides that the 2–3 up-shift is executed, the discharging pressure control which is executed in steps S71 to S78, the charging pressure control which is executed in steps S79 to S86 and the torque down control which is executed in steps S87 to S94, are executed, respectively.

(1) Discharging pressure control

At a step S72, the A/T control unit 20 outputs an ON command to the 2–4/B timing solenoid 26 (corresponding to the discharging pressure control actuator e) and outputs a command indicative of a high duty ratio to the 2–4/B duty solenoid 24.

At a step S73, the A/T control unit 20 decides as to whether the timer value T is greater than or equal to a first preset timer value T1 or not. The first preset timer value T1 is set to a minimum time period necessary for finishing the piston stroke of the high clutch H/C from the starting of the shift change. When the decision at the step S73 is YES, the routine proceeds to a step S74. When the decision at the step S73 is NO, the routing returns to the step S72.

At the step S74, the A/T control unit 20 holds the ON command to the 2–4/B timing solenoid 26 and outputs the command for radically decreasing the duty ratio and then gradually decreasing the duty ratio with the lapse of time to the 2–4/B duty solenoid 24.

At a step S75, the A/T control unit 20 decides as to whether the actual gear ratio G represented by the count value is smaller than or equal to a second preset gear ratio G2 which is set at a value close to a gear ratio at the third speed gear position after the shift change at the inertia phase finishing period. When the decision at the step S75 is YES, the routine proceeds to a step S76. When the decision at the step S75 is NO, the routine returns to a step S74.

At the step S76, the A/T control unit 20 outputs an OFF command to the 2–4/B timing solenoid 24 and outputs a command for setting the duty ratio at a medium value to the 2–4/B duty solenoid 24.

At a step S77, the A/T control unit 20 decides as to whether the timer value T is greater than or equal to a shift-change finish timer value $T_2$ or not. When the decision at the step S77 is YES, the routine proceeds to a step S78. When the decision at the step S77 is NO, the routine returns to the step S76.

At the step S78, the A/T control unit 20 outputs the ON command to the 2–4/B timing solenoid 26 and outputs a command for resetting the duty ratio to the initial high duty ratio to the 2–4/B duty solenoid. Then, the routine proceeds to End.

(2) Charging pressure control (corresponding to up-shift charging pressure control means j)

At a step S80, the A/T control unit 20 outputs a command signal indicative of a low duty ratio to the line pressure duty solenoid 23 (corresponding to a charging pressure control actuator i).

At a step S81, the A/T control unit 20 decides as to whether the actual gear ratio G is smaller than a first preset gear ratio G1 or not. The first preset gear ratio G1 is set at a value close to a gear ratio at the second speed gear position after the shift change at the inertia phase finishing period. When the decision at the step S81 is YES, the routine proceeds to a step S82. When the decision at the step S81 is NO, the routine returns to the step S80.

At the step S82, the A/T control unit 20 outputs a command for increasing the duty ratio by a predetermined gradient and then holding at a raised-up duty ratio to the line pressure duty solenoid 23.

At a step S83, the A/T control unit 20 decides as to whether the actual gear ratio G is smaller than the second preset gear ratio G2 or not. When the decision at the step S83 is YES, the routine proceeds to a step S84. When the decision at the step S83 is NO, the routine returns to the step S82.

At the step S84, the A/T control unit 20 outputs a command for decreasing the duty ratio by a predetermined gradient and then holding the decreased duty ratio to the line pressure duty solenoid 23.

At a step S85, the A/T control unit decides as to whether the timer count value T is greater than or equal to the shift change finish timer value T2 or not. When the decision at the step S85 is YES, the routine proceeds to a step S86. When the decision at the step S85 is NO, the routine returns to the step S84.

At the step S86, the A/T control unit 20 outputs a command for resetting the duty ratio so as to execute a normal line pressure control according to the throttle opening degree to the line pressure duty solenoid 23. Then, the routine proceeds to End.

(3) Torque down control

At a step S88, the A/T control unit 20 holds the engine torque as it is.

At a step S89, the A/T control unit 20 decides as to whether the timer count value T is greater than or equal to the first preset timer value T1 or not. When the decision at the step S89 is YES, the routine proceeds to a step S90. When the decision at the step S89 is NO, the routine returns to the step S88.

At the step S90, the A/T control unit 20 outputs a command for gradually decreasing the engine torque. In case that the torque down control is executed by controlling the throttle valve, the throttle valve is gradually closed to decease the opening degree thereof. In case that the torque down control is executed by controlling the supply of fuel, a fuel cut control is executed so as to increase the number of engine cylinders to which the supply of fuel is cut.

At a step S91, the A/T control unit 20 decides as to whether the actual gear ration G is smaller than or equal to the first preset gear ratio G1. When the decision at the step S91 is YES, the routine proceeds to a step S92. When the decision at the step S91 is NO, the routine returns to the step S90.

At the step S92, the A/T control unit 20 outputs a command signal for suppressing the engine torque at a low condition. In case that the torque down control is executed by controlling the throttle valve, the throttle valve is fully closed in reply to the command signal. In case that the torque down control is executed by controlling the supply of fuel, a fuel cut control is executed so as to cut the supply of fuel to each cylinder or selected cylinder.

At a step S93, the A/T control unit 20 decides as to whether the actual gear ratio G is smaller than or equal to the third preset gear ratio $G_3$ or not, where $G_3$ is smaller that $G_3$. When the decision at the step S93 is YES, the routine proceeds to a step S94. When the decision at the step S93 is NO, the routine returns to the step S92.

At the step S94, the A/T control unit 20 outputs a command signal for resetting the engine torque to the initial value.

During the up-shift operation, ON command is outputted to the low clutch timing solenoid 25.

[2–3 up-shift control operation]

Figure 8:
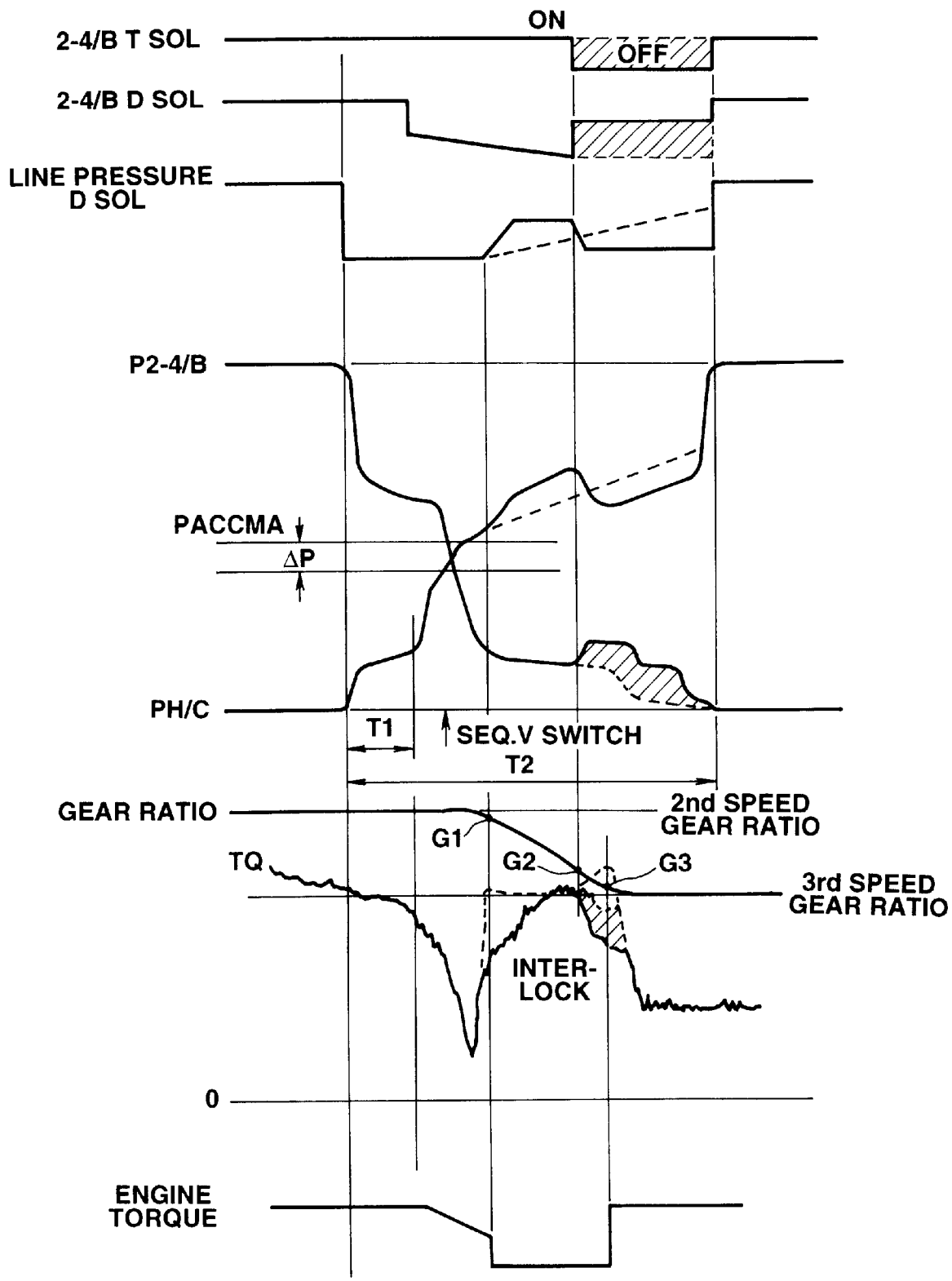
FIG. 8 is a time chart which shows transient characteristics of a control command, a hydraulic pressure, a gear ratio, an output shaft torque of the first embodiment during the 2–3 up-shift.
Figure 9:
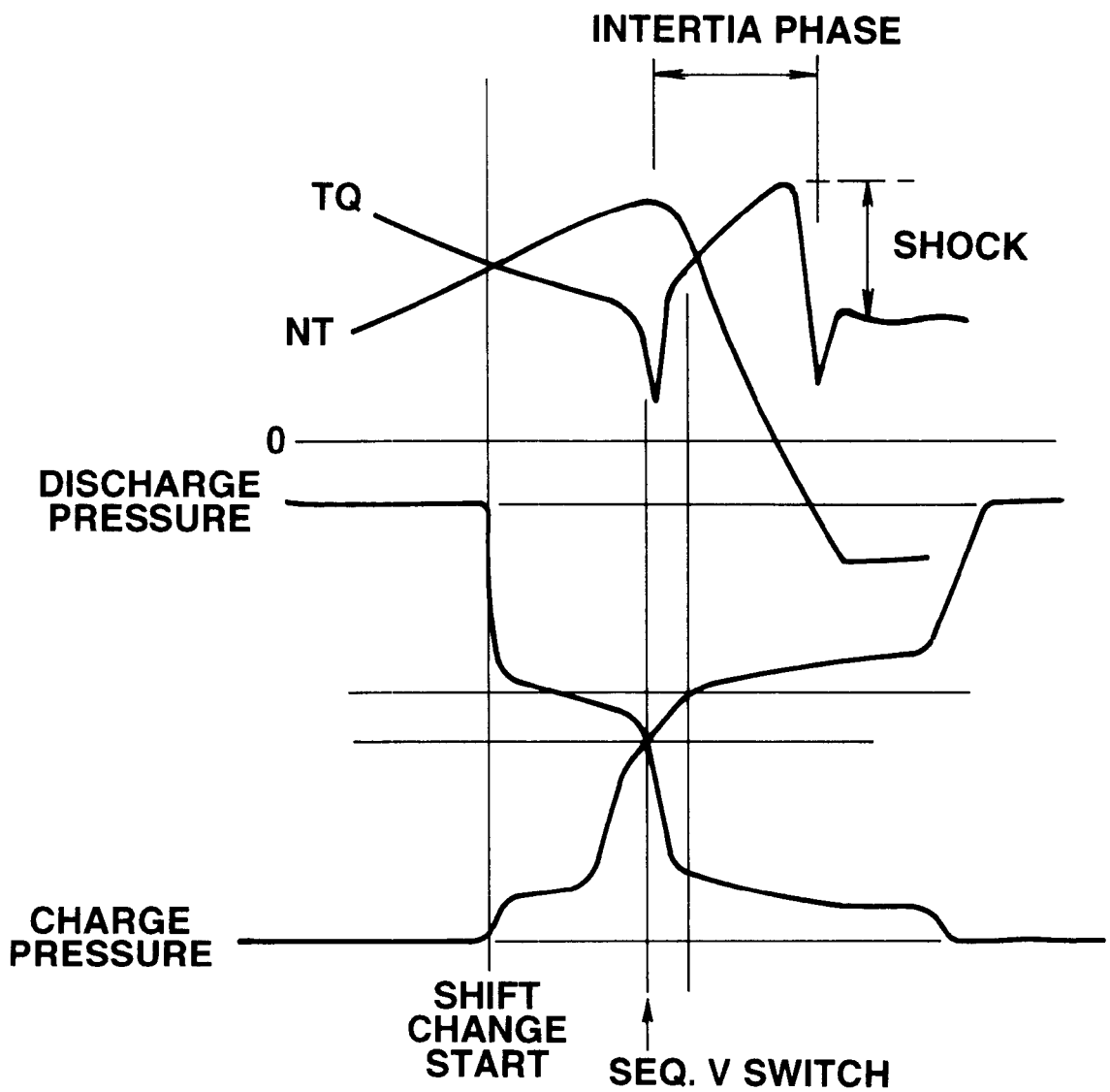
FIG. 9 is a time chart which shows transient characteristics of an output shaft torque, a turbine rotation speed, a charging pressure, and a discharging pressure of a conventional apparatus during the 2–3 up-shift, where a switching point of a sequence valve is tuned to an interlock side.

On the basis of the time chart of FIG. 8, the manner of operation of the 2–3 up-shift control in the medium to high throttle opening degree will be discussed hereinafter.

When it is decided that the 2–3 up-shift is executed according to the increase of the vehicle speed due to the depression of an acceleration pedal, the command to the second shift solenoid 22 is changed from ON to OFF. Therefore, the hydraulic passage to the high clutch H/C is switched from the drain side to the D-range pressure supply side, and the hydraulic passage to the 2–4 brake 2–4/B is switched from the D-range pressure supply side to the drain side.

The discharging pressure control from the 2–4 brake 2–4/B under the shift change transient condition is executed by means of a back pressure control of the 2–4 brake accumulator 10 (corresponding to the first accumulator g of FIG. 1) disposed in the hydraulic passage connected to the 2–4 brake 2–4/B.

The charging pressure control to the high clutch H/C under the shift change transient condition is executed by means of a back pressure control of the high clutch accumulator 11 (corresponding to the second accumulator k of FIG. 1) disposed in the hydraulic passage connected to the high clutch H/C.

The torque down control under the shift change transient condition is executed by outputting a As control command from the A/T control unit 20 to an engine control unit.

(1) Discharging pressure control operation

In a range form the start of the up-shift to a time that the actual gear ratio reaches the second preset gear ratio G2, ON command is outputted to the 2–4/B timing solenoid 26. Therefore, the 2–4/B timing valve 7 (corresponding to a timing valve h) is switched to a communication side to which the high clutch pressure $P_{H/C}$ functioning as an operation signal pressure of the 2–4 brake sequence valve 8 is led. The 2–4 brake sequence valve 8 is switched from the supply side, which supplies the second accumulator control pressure $P_{ACCMB}$ to the 2–4 brake accumulator 10, to the drain side. Therefore, the 2–4 brake pressure P2–4/B is quickly decreased from the shelf pressure characteristic at the switching point of the 2–4 brake sequence valve 8, as shown in FIG. 8.

The shift change is proceeded according to the decrease of the 2–4 brake pressure P2–4/B. In the range from a time that the actual gear ratio G reaches the second preset gear ratio G2 to a time at the end of the shift change, the command to the 2–4/B timing solenoid 26 is switched from ON to OFF, and the command for increasing the duty ratio is outputted to the 2–4/B duty solenoid 24.

Therefore, the 2–4 brake sequence valve 8 is switched such that the high clutch pressure PH/C applied to an end portion of the valve spool is drained and the second accumulator control pressure $P_{ACCMB}$ is supplied to the 2–4 brake accumulator 10 according to the operation signal pressure of the first accumulator control pressure $P_{ACCMA}$. Therefore, the 2–4 brake pressure $P_{2-4/B}$ performs the characteristics that the hydraulic pressure is increased during the period from outputting OFF command to the 2–4/B timing solenoid 26 to the end of the shift change.

(2) Charging pressure control operation

In the range from the start of the up-shift to a time that the actual gear ratio G reaches the first preset gear ratio G1 indicative of the inertia phase starting time, by outputting the command for outputting the low duty ratio to the line pressure duty solenoid 23, the first accumulator control pressure $P_{ACCMA}$ set in the low pressure level is supplied to the back pressure chamber of the high clutch accumulator 11. Therefore, the high clutch pressure $P_{H/C}$ is gradually increased to the level of the accumulator pressure after the elapse of the clutch piston stroke, as shown by the characteristic curve of the high clutch pressure $P_{H/C}$ of FIG. 8.

In the inertia phase range from the first preset gear ratio G1 to the second preset gear ratio G2, by outputting the command for outputting the high duty ratio to the line duty solenoid 23, the first accumulator control pressure $P_{ACCMA}$ set in low pressure level is supplied to the back pressure chamber of the high clutch accumulator 11. Therefore, the high clutch pressure $P_{H/C}$ is radically increased with a large increasing gradient as shown by the high clutch pressure $P_{H/C}$ characteristic curve of FIG. 8.

In the inertia phase range from the second preset gear ratio G2 to the end of the shift change, by outputting the command for outputting the low duty ratio to the line pressure solenoid 23, the first accumulator control pressure $P_{ACCMA}$ set in low pressure level is supplied to the back pressure chamber of the high clutch accumulator 11. Therefore, the high clutch pressure $P_{H/C}$ performs a characteristic that the hydraulic pressure is decreased at the end of the shift change, as shown by the characteristic curve of the high clutch pressure $P_{H/C}$ of FIG. 8.

(3) Torque down control operation

In the inertia phase range from the first preset gear ratio G1 to the third preset gear ratio G3 just before the end of the inertia phase, the control for decreasing the engine torque is executed in order to decrease the output shaft torque TQ.

[Shock reducing operation]

In the range from the second preset gear range G2 indicative of the close time of the inertia phase end to the end of the shift change, the 2–4 brake pressure $P_{2-4}/B$ is temporally increased according to the increase of the accumulator back pressure. Accordingly, the 2–4 brake 2–4/B put in a generally disengaged condition is put in a generally interlock condition by the increase of the engagement capacity. The increase of the engagement capacity decreases the part of the output shaft torque at the time just before the end of the inertia phase. Such effective amount due to the discharging pressure control is shown by a hatched part of the output shaft torque characteristic of FIG. 8.

By the charging pressure control to the high clutch H/C, in the range from the second preset gear ratio G2 indicative of a time just before the end of the inertia phase to the end of the shift change, that is, in the range as same as that of the discharging control, the command indicative of the low duty ratio is outputted to the line pressure duty solenoid 23 and therefore the high clutch pressure $P_{H/C}$ is temporally decreased. Accordingly, at the time just before the inertia phase of the up-shift, the engagement capacity of the high clutch H/C is decreased and therefore the change speed of the engine rotation speed (turbine rotation), more particularly, the change speed of the gear ratio is suppressed. As a result, the peak output shaft torque at the time just before the end of the inertia phase is kept low.

In the range from the second preset gear ratio G2 to the end of the shift change, the increase of the discharging pressure of the 2–4 brake 2–4/B and the decrease of the charging pressure of the high clutch H/c are simultaneously executed. Therefore, the synergic effect by partial decrease of the output shaft torque due to the increase of the discharging pressure and suppression of the change speed of the engine rotation speed due to the decrease of the charge pressure is ensured, and the shock whose magnitude is determined by the torque difference between the peak output shaft torque at the time just before the end of the inertia phase and the output shaft torque after the inertia phase, is largely decreased.

In addition, since the torque down control for decreasing the engine torque in the inertia phase is used with this pressure control, the output shaft torque TQ in the inertia phase range is kept small and therefore the shift change is smoothly executed. In FIG. 8, the dotted line represents the output shaft toque characteristic wherein the torque down control is not executed.

[Time necessary for shift change]

In case that a control for delaying the shift change by decreasing the changing pressure of the friction element to be engaged by shift change transient hydraulic pressure control of the up-shift, larger the decreased amount to the charging pressure becomes in order to obtain the shock preventing effect, longer the time necessary for the shift change becomes.

In contrast, the up-shift control according to the present invention is arranged to decrease the output shaft torque by the increase of the discharging pressure of the 2–4 brake 2–4/B to be disengaged, the time necessary for the shift change is not increased. Although the present invention is arranged to execute the decreasing control of the charging of the high clutch to be engaged during the up-shift, the charging pressure increasing control to the high clutch H/C is executed during a period from the first preset gear ratio G1 indicative of the start of the inertia phase to the second present gear ratio G2 indicative of a close time to the end of the inertia phase. Therefore, the shift change proceeding speed for changing the gear ratio is increased in this period. Accordingly, even if the shift change speed is delayed by the decrease of the. charging pressure of the high clutch, the total shift change time is not elongated.

With the thus arranged up-shift control apparatus according to the present invention, the following advantages are obtained.

(1) Since there is provided the up-shift discharging pressure control means for outputting the OFF command to the 2–4/B timing solenoid 26 during a period from the second preset gear ratio G2 to the end of the shift change so as to increase the discharging pressure of the 2–4 brake 2–4/B, it becomes possible to suppress the shift shock without elongating the shift change time period of the 2–3 up-shift.

(2) There are provided the 2–4 brake accumulator 10 at a hydraulic passage connected to the 2–4 brake 2–4/B, the 2–4 brake sequence valve 8, and the 2–4/B timing valve 7 for switching between the supply of the accumulator pressure to the back pressure chamber of the 2–4 brake accumulator 10 and the discharge of the accumulator pressure from the 2–4 brake accumulator 10. Further, the up-shift discharging pressure control means is arranged to output OFF command to the 2–4/B timing solenoid 26 during a period from the second preset gear ratio G2 to the end of the shift change so as to select a condition that the accumulator pressure is supplied to the back pressure chamber of the 2–4 brake accumulator 10. Therefore, it becomes possible to suppress the shift shock without elongating the shift change time period of the 2–3 up-shift, by means of a simple and high-responsible accumulator back pressure control.

(3) Since there is provided the up-shift charging pressure control which outputs the command to the line pressure duty solenoid 23 so that the charging pressure to the high clutch H/C is increased during the period between the start of the inertia phase to the first preset gear ratio G1 and that the charging pressure to the 2–4 brake 2–3/B is decreased during the period between the second preset gear ratio and the end of the shift change, it becomes possible to ensure both of the suppression of the shift shock and the reasonable setting of the shift change time in high level during the 2–3 up-shift.

(4) There are provided the high clutch accumulator 11 connected to the high clutch H/C, the first accumulator control valve 3 for controlling the back pressure of the high clutch accumulator 11, and the line pressure duty solenoid 23 as the charging pressure control actuator. Further, the up-shift charging pressure control means is arranged to output the duty command to the line pressure duty solenoid 23 so as to increase the back pressure of the high clutch accumulator 10 at the time that the actual gear ratio reaches the first preset gear ratio G1 and to decrease the back pressure of the high clutch accumulator 11 during a period from the second preset gear ratio G2 to the end of the shift change. Therefore, it becomes possible to ensure both of the suppression of the shift shock and the reasonable setting of the shift change time in high level during the 2–3 up-shift, by means of the high responsible accumulator back pressure control.

Although the first embodiment according to the present invention has been shown and described as to the 2–3 up-shift, it will be understood that the present invention may be applied to a case of the 3–4 up-shift where the low clutch L/C is disengaged and the 2–4 brake 2–4/B is engaged. In this case, the back pressure of the low clutch accumulator 9 is controlled by the low clutch sequence valve 6. Further, the present invention may be applied to a case of 4–5 up-shift if the applied automatic transmission is of a five speed type.

While the embodiment has been shown and described as to a system using the line pressure solenoid 23 and the 2–4/B duty solenoid 24, it will be understood that the present invention may be applied to a system including at least one duty solenoid valve for controlling the accumulator pressure.

Although the embodiment of the present invention has been shown and described such that the discharging pressure control of the first friction element and the charging pressure control of the second friction element are executed when it is decided that the 2–3 up-shift is executed regardless the magnitude of the throttle opening degree, it will be understood that both of the discharging pressure control and the charging pressure control are executed only when the throttle opening degree is within a range from middle to high opening degree.

While the embodiment of the present invention has been shown and described such that the discharging pressure is increased by a predetermined increased amount and the charging pressure is decreased by a predetermined decreased amount during the 2–3 up-shift, the predetermined increased amount and the predetermined decreased amount may be changed according to the magnitude of the throttle opening degree.

The entire disclosure of Japanese Patent Application No. 8-202508 filed on Jul. 31, 1996 including specification, claims, drawings and summary are incorporated herein by reference in its entirety.

What is claimed is:

1. An up-shift control apparatus of an automatic transmission, the automatic transmission including first and second friction elements and executing an up-shift by disengaging the first friction element and engaging the second friction element, said up-shift control apparatus comprising:

an up-shift decision means for deciding as to whether the up-shift operation is executed;

a gear ratio detecting means for detecting a gear ratio of the automatic transmission;

a discharging pressure control actuator for controlling a discharging pressure of the first friction element;

an up-shift discharging pressure control means for outputting a first command signal to said discharging pressure control actuator so as to temporally increase the discharging pressure of the first friction element when the detected gear ratio becomes a preset gear ratio indicative of a time just before the end of the inertia phase during the up-shift.

2. An up-shift control apparatus as claimed in claim 1, further comprising a first accumulator connected to the first friction element, the first accumulator having a back pressure chamber to which a timing valve is connected so as to switch a supply of the accumulator pressure to the back pressure chamber and a discharge of the accumulator pressure from the back pressure chamber, said discharging pressure control actuator including a timing solenoid connected to the timing valve, said up-shift discharging pressure control means outputting a second command signal to the timing solenoid so as to supply the accumulator pressure to the back pressure chamber of the first accumulator when the detected gear ratio becomes a preset gear ratio indicative of a time just before the end of the inertia phase during the up-shift.

3. An up-shift control apparatus as claimed in claim 1, further comprising a charging pressure control actuator for controlling a charging pressure of the second friction element and an up-shift charging pressure control means for outputting a third command signal to the charging pressure control actuator so as to increase the charging pressure of the second friction element when the detected gear ratio becomes a first gear ratio indicative of a starting time of the inertia phase, and to temporally decrease the charging pressure of the second friction element when the detected gear ratio becomes a second preset gear ratio indicative of a time just before the end of the inertia phase during the up-shift.

4. An up-shift control apparatus as claimed in claim 3, further comprising a second accumulator connected to the second friction element, the second accumulator having a back pressure chamber to which an accumulator back pressure control valve for controlling a pressure of the back pressure chamber of the second accumulator is connected, said charging pressure control actuator including a hydraulic pressure control solenoid connected to the accumulator back pressure control solenoid, said up-shift charging pressure control means outputting a fourth command signal to hydraulic pressure control solenoid so as to increase the pressure of the back pressure chamber of the second friction element when the detected gear ratio becomes the first gear ratio, and to temporally decrease the pressure of the back pressure chamber of the second friction element when the detected gear ratio becomes the second preset gear ratio, during the up-shift.

5. An up-shift control apparatus of an automatic transmission, the automatic transmission including a first friction element to be disengaged in an up-shift of the automatic transmission and a second friction element to be engaged in the up-shift, said up-shift control apparatus comprising:

a discharging pressure control actuator connected to the first friction element;

a sensor unit detecting an operating condition of the automatic transmission; and an automatic transmission control unit arranged to decide as to whether the up-shift operation is executed on the basis of information from said sensor unit, to obtain a gear ratio of the automatic transmission on the basis of the information of said sensor unit, and to output a command to said discharging pressure control actuator so as to temporally increase the discharging pressure of the first friction element when the detected gear ratio becomes a preset gear ratio indicative of a time just before the end of the inertia phase during the up-shift.

6. An up-shift control apparatus as claimed in claim 5, further comprising a charging pressure control actuator connected to the first friction element, said automatic transmission control unit being arranged to output a command to the charging pressure control actuator so as to increase the charging pressure to the second friction element when the detected gear ratio becomes a first gear ratio indicative of a starting time of the inertia phase, and to temporally decrease the charging pressure of the second friction element when the detected gear ratio becomes a second preset gear ratio indicative of a time just before the end of the inertia phase during the up-shift.

* * * * *